(12) United States Patent
Pulsipher

(10) Patent No.: US 8,806,490 B1
(45) Date of Patent: Aug. 12, 2014

(54) METHOD AND APPARATUS FOR MANAGING WORKFLOW FAILURES BY RETRYING CHILD AND PARENT ELEMENTS

(75) Inventor: Darren W. Pulsipher, Alpine, UT (US)

(73) Assignee: Cadence Design Systems, Inc., San Jose, CA (US)

( * ) Notice: Subject to any disclaimer, the term of this patent is extended or adjusted under 35 U.S.C. 154(b) by 1716 days.

(21) Appl. No.: 11/297,562

(22) Filed: Dec. 8, 2005

Related U.S. Application Data

(60) Provisional application No. 60/634,694, filed on Dec. 8, 2004, provisional application No. 60/634,481, filed on Dec. 8, 2004.

(51) Int. Cl.
*G06F 9/46* (2006.01)

(52) U.S. Cl.
USPC .......................................... 718/100

(58) Field of Classification Search
USPC .......................... 718/101; 700/100
See application file for complete search history.

(56) References Cited

U.S. PATENT DOCUMENTS

| | | | |
|---|---|---|---|
| 4,825,354 A | 4/1989 | Agrawal et al. | |
| 5,319,758 A | 6/1994 | Arai et al. | |
| 5,381,534 A | 1/1995 | Shi | |
| 5,459,871 A | 10/1995 | Van Den Berg | |
| 5,802,291 A | 9/1998 | Balick et al. | |
| 5,832,484 A | 11/1998 | Sankaran et al. | |
| 5,903,891 A | 5/1999 | Chen et al. | |
| 6,009,266 A | 12/1999 | Brownell et al. | |
| 6,182,154 B1 | 1/2001 | Campagnoni et al. | |
| 6,182,158 B1 | 1/2001 | Kougiouris et al. | |
| 6,223,200 B1 | 4/2001 | Barnes et al. | |
| 6,226,618 B1 | 5/2001 | Downs et al. | |
| 6,247,041 B1 | 6/2001 | Krueger et al. | |
| 6,269,373 B1 | 7/2001 | Apte et al. | |
| 6,321,264 B1 | 11/2001 | Fletcher et al. | |
| 6,378,066 B1 | 4/2002 | Lewis | |
| 6,418,484 B1 | 7/2002 | Radia | |
| 6,438,616 B1 | 8/2002 | Callsen et al. | |

(Continued)

FOREIGN PATENT DOCUMENTS

EP  1141793 B1 * 11/2003

OTHER PUBLICATIONS

Final Office Action dated Jul. 21, 2009 for U.S. Appl. No. 11/297,621.
Non-Final Office Action dated Nov. 10, 2009 for U.S. Appl. No. 11/297,604.
Non-Final Office Action dated Nov. 12, 2009 for U.S. Appl. No. 11/297,621.

(Continued)

*Primary Examiner* — Meng An
*Assistant Examiner* — Eric C Wai
(74) *Attorney, Agent, or Firm* — Vista IP Law Group, LLP

(57) ABSTRACT

Method of managing workflow failures in a distributed computing environment. A retry value is associated with one or more workflow elements. An element or section of a workflow that does not successfully execute in the distributed computing network is identified. The workflow that does not successfully execute is retried according to a first retry value. The maximum number of times that the first element can be retried is indicated or represented by the first retry value. If one or more workflow elements fail, parent workflows can be retried according to a parent workflow retry value. Elements of the workflow that failed and successfully executed can be retried when the workflow is retried. Execution of workflow elements can also depend upon a condition concerning one or more other elements.

51 Claims, 16 Drawing Sheets

(56) References Cited

U.S. PATENT DOCUMENTS

| | | | |
|---|---|---|---|
| 6,505,210 B1 | 1/2003 | Frey et al. | |
| 6,594,671 B1 | 7/2003 | Arman et al. | |
| 6,651,047 B1 | 11/2003 | Weschler, Jr. | |
| 6,678,714 B1 | 1/2004 | Olapurath et al. | |
| 6,681,242 B1 | 1/2004 | Kumar et al. | |
| 6,704,806 B1 | 3/2004 | Decker | |
| 6,772,216 B1 | 8/2004 | Ankireddipally et al. | |
| 6,792,606 B2 | 9/2004 | Halter et al. | |
| 6,804,714 B1 | 10/2004 | Tummalapalli | |
| 6,961,716 B2 | 11/2005 | Rhodes | |
| 6,993,771 B1 | 1/2006 | Hasha et al. | |
| 7,039,695 B1 | 5/2006 | DeLuca et al. | |
| 7,043,731 B2 | 5/2006 | Ramaswamy | |
| 7,051,098 B2 | 5/2006 | Masters et al. | |
| 7,184,967 B1 | 2/2007 | Mital et al. | |
| 7,269,650 B2 * | 9/2007 | Hamdan | 709/224 |
| 7,379,994 B2 | 5/2008 | Collazo | |
| 7,506,046 B2 | 3/2009 | Rhodes | |
| 7,571,181 B2 | 8/2009 | Rhodes | |
| 7,584,474 B2 * | 9/2009 | Gondi et al. | 718/101 |
| 2002/0099821 A1 | 7/2002 | Hellerstein et al. | |
| 2002/0116205 A1 | 8/2002 | Ankireddipally et al. | |
| 2003/0037136 A1 | 2/2003 | Labovitz et al. | |
| 2003/0088708 A1 | 5/2003 | Lewallen | |
| 2003/0100957 A1 | 5/2003 | Chaffee et al. | |
| 2003/0120701 A1 | 6/2003 | Pulsipher et al. | |
| 2003/0120708 A1 | 6/2003 | Pulsipher et al. | |
| 2003/0120709 A1 | 6/2003 | Pulsipher et al. | |
| 2003/0120710 A1 | 6/2003 | Pulsipher et al. | |
| 2003/0120764 A1 | 6/2003 | Laye et al. | |
| 2003/0187826 A1 * | 10/2003 | Kennedy et al. | 707/1 |
| 2004/0019898 A1 | 1/2004 | Frey et al. | |
| 2004/0025163 A1 | 2/2004 | Babutzka et al. | |
| 2004/0078105 A1 * | 4/2004 | Moon et al. | 700/100 |
| 2005/0188088 A1 | 8/2005 | Fellenstein et al. | |
| 2005/0198247 A1 | 9/2005 | Perry et al. | |
| 2005/0240668 A1 | 10/2005 | Rolia et al. | |
| 2005/0283786 A1 * | 12/2005 | Dettinger et al. | 718/104 |
| 2006/0048157 A1 | 3/2006 | Dawson et al. | |

OTHER PUBLICATIONS

L. Ferriera, et al., "Introduction to Grid Computing With Globus", *IBM Redbooks,* Sep. 2003.

Non Final Office Action dated Apr. 2, 2008 for U.S. Appl. No. 11/297,621.

Final Office Action dated Oct. 21, 2008 for U.S. Appl. No. 11/297,621.

Non Final Office Action dated Mar. 16, 2009 for U.S. Appl. No. 11/297,621.

Non-Final Office Action dated Mar. 31, 2010 for U.S. Appl. No. 11/297,268.

Final Office Action dated Apr. 12, 2010 for U.S. Appl. No. 11/297,621.

Non-Final Office Action dated Mar. 4, 2010 for U.S. Appl. No. 11/297,609.

Final Office Action dated Jun. 8, 2010 for U.S. Appl. No. 11/297,604.

Final Office Action Date Aug. 13, 2010 for U.S. Appl. No. 11/297,609.

Final Office Action dated Oct. 20, 2010 for U.S. Appl. No. 11/297,268.

Non-Final Office Action dated Aug. 3, 2010 for U.S. Appl. No. 11/297,621.

Non-Final Office Action dated Nov. 16, 2010 for U.S. Appl. No. 11/297,609.

Non-Final Office Action dated May 3, 2011 for U.S. Appl. No. 11/297,604.

Notice of Allowance dated Mar. 4, 2011 for U.S. Appl. No. 11/297,609.

Non-Final Office Action dated Jul. 28, 2011 for U.S. Appl. No. 11/297,621.

Notice of Allowance dated Sep. 30, 2011 for U.S. Appl. No. 11/297,604.

Notice of Allowance dated Apr. 12, 2012 for U.S. Appl. No. 11/297,268.

Final Office Action dated Jan. 19, 2012 for U.S. Appl. No. 11/297,621.

* cited by examiner

Work Inheritance

| Status Icon ☒ | |
|---|---|
| 1 | Created |
| ⧖ | Pending |
| ▭ | Blocked |
| ‖ | Suspended |
| 🏃 | Active |
| ⊘ | Cancelled |
| ✓ | Completed |
| ◇ | Warning |
| ✕ | Error |
| ☠ | Killed |

Work States

Fig. 4C

Work States

TASK STATES

| Name | | Time | | |
|---|---|---|---|---|
| 1 | BuildCycle(B01) | Finishes when all sub-work is finished | | |
| 1.1 | Build3rdParty(B01) | Note: Finishes after 1.1.1 and 1.1.2 | | |
| 1.1.1 | Build3rdPartyTool(B01, "1") | Finishes after 1.1.1.1 | | |
| 1.1.1.1 | make tool1 | | | |
| 1.1.2 | Build3rdPartyTool(B01, "2") | Finishes after 1.1.2.1 | | |
| 1.1.2.1 | make tool2 | | | |
| 1.2 | preBuild.pl B01 | Start after 1.1 | | |
| 1.3 | BuildComponent(B01, "1") | Start after 1.2 | | Finish after 1.3.3 |
| 1.3.1 | premake.pl component 1 | | | |
| 1.3.2 | make component 1 | Start after 1.3.1 | | |
| 1.3.3 | postmake.pl component 1 | Start after 1.3.2 | | |
| 1.4 | BuildComponent(B01, "2") | Start after 1.2 | | Finish after 1.4.3 |
| 1.4.1 | premake.pl component 2 | | | |
| 1.4.2 | make component 2 | Start after 1.4.1 | | |
| 1.4.3 | postmake.pl component 2 | Start after 1.4.2 | | |
| 1.5 | BuildComponent(B01, "3") | Start after 1.2 | | Finish after 1.5.3 |
| 1.5.1 | premake.pl component 3 | | | |
| 1.5.2 | make component 3 | Start after 1.5.1 | | |
| 1.5.3 | postmake.pl component 3 | Start after 1.5.2 | | |
| 1.6 | postMake.pl B01 | Start after 1.3, 1.4, and 1.5 | | |

TASK TIMING

Fig. 4F

Job States

Table 2-1 Timing Chart

Legend: Created, Pending, Blocked, Active, Completed

| Name | | Time | | |
|---|---|---|---|---|
| 1 | BuildCycle(B01) | | | |
| 1.1 | GatherCode(B01) | | Finishes after 1.1.1 and 1.1.2 | |
| 1.1.1 | MergeCode (B01) | | | |
| 1.1.2 | Get3rdParty (B01) | | | |
| 1.2 | BuildComponent (B01, "1") | Start after 1.1 | Finishes after 1.2 * | |
| 1.2.1 | BuildProduct (B01) | Start w/Parent | | |
| 1.2.2 | BuildComponent (B01, "1") | Start w/Parent | | |
| 1.2.3 | BuildComponent (B01, "2") | Start w/Parent | | |
| 1.2.4 | BuildComponent (B01, "3") | Start w/Parent | | |
| 1.3 | TestProduct (B01) | Starts when 1.2 is finished | Finishes after 1.3 | |
| 1.3.1 | TestComponents (B01) | Start with 1.3 | | |
| 1.3.1.1 | TestComponent (B01, "1") | Start with 1.3.1 | Finishes after 1.3.1 * | |
| 1.3.1.2 | TestComponent (B01, "2") | Start with 1.3.1 | | |
| 1.3.1.3 | TestComponent (B01, "3") | Start with 1.3.1 | | |
| 1.3.2 | TestSystemIntegration (B01) | Start with 1.3.1 | | |
| 1.3.3 | TestSystemFlow (B01) | Start with 1.3.1 | | |
| 1.4 | PackageProduct (B01) | Start after 1.3 | | |
| 1.4.1 | Gather3rdParty (B01) | | | |
| 1.4.2 | GatherBinaries (B01) | | | |
| 1.4.3 | CreateInstallation (B01) | | | |
| 1.4.4 | CreatePackage (B01) | | | |

JOB TIMING

Fig. 4H

METHOD AND APPARATUS FOR MANAGING WORKFLOW FAILURES BY RETRYING CHILD AND PARENT ELEMENTS

CROSS REFERENCE TO RELATED APPLICATIONS

This application claims priority under 35 U.S.C. §119 of U.S. Provisional Application No. 60/634,694, filed Dec. 8, 2004, entitled "Method and Apparatus for Coordinating Fault Tolerance Over Distributed Activities," the contents of which are incorporated herein by reference.

This application claims priority under 35 U.S.C. §119 of U.S. Provisional Application No. 60/634,481, filed Dec. 8, 2004, entitled "Method and Apparatus for Operation of Distributed Computing Systems," the contents of which are incorporated herein by reference.

This application is also related to co-pending U.S. application Ser. Nos. 10/247,970, 10/251,230, 10/251,019, and 10/251,747, all of which were filed on Sep. 19, 2002, and U.S. Provisional Application Ser. No. 60/342,630, filed on Dec. 20, 2001, all of which are incorporated herein by reference.

FIELD OF THE INVENTION

The present invention relates generally to distributed computing systems and, more particularly, to managing workflow failures in a distributed computing system.

BACKGROUND

Distributed or grid computing provides the ability to share and allocate processing requests and resources among various nodes, computers or server farm(s) within a grid. A server farm is generally a group of networked servers or, alternatively, a networked multi-processor computing environment, in which work is distributed between multiple processors.

Workload is distributed between individual components or processors of servers. Work requests or workflow having one or more executable commands are used to execute work requests on a grid. Workflow includes both "jobs" and "tasks." An example of a job is a collection of work. A work is a superclass of jobs or tasks. A job contains any number of jobs or tasks. These workflows are used to execute commands using one or more resources on the grid. A resource is generally something that is consumed during execution of a workflow or job, such as a machine on the grid. Resources that are distributed throughout the grid include various objects. An object is a self-contained module of data and associated processing that resides in a process space. There can be one or multiple object per process. These objects can be distributed throughout various portions of the grid, e.g., in various geographic locations.

Objects can reside on various servers or server farms. A server farm environment can include different classes of resources, machine types and architectures, operating systems, storage and hardware. Server farms are typically coupled with a layer of load-balancing or distributed resource management (DRM) software to perform numerous tasks, such as managing and tracking processing demand, selecting machines on which to run a given task or process, and scheduling tasks for execution.

An important aspect of managing a computing system, particularly a distributed or grid-based computing system, is the task of managing failures in a workflow. Managing workflow on a grid, however, can be difficult since a grid is less stable than, for example, a server farm. For example, certain machines on a grid may not be configured to be as stable as others. Further users attempt to use many or all available machines on the grid which, in turn, can cause a job within a workflow to fail.

Accordingly, there exists a need for a method and system for managing workflow failures within a grid. Further, there exists a need for a method and system for retrying a workflow or elements thereof upon a workflow failure. Embodiments of the invention fulfill these needs.

SUMMARY

According to one embodiment, a method of managing a workflow failure in a distributed computing environment includes identifying a first element of the workflow that does not successfully execute in the distributed computing network and retrying the first element. The first element is associated with a first retry value, which indicates a maximum number of times the first element can be retried.

According to another embodiment, a method of managing a failure in a workflow having a plurality of workflow elements in a distributed computing environment includes associating a first retry value with a first element of the workflow and associating a second retry value with a second element of the workflow. One or more workflow elements that do not successfully execute in the distributed computing network are identified and retried. The first retry value indicates a maximum number of times the first element can be retried, and the second retry value indicates a maximum number of times the second element can be retried.

According to another alternative embodiment, a method of managing a parent workflow that does not successfully execute in a distributed computing environment includes associating a first retry value with a first child element of the parent workflow and associating a second retry value with a second child element of the parent workflow. One or more child workflow elements that do not successfully execute in the distributed computing network are identified and retried. The first retry value indicates a maximum number of times the first child workflow element can be retried, and the second retry value indicates a maximum number of times the second child workflow element can be retried.

In various embodiments, an element that does not successfully execute can be an element that is an error state. For example, a workflow may execute, but terminate with at least one error. Further, the number of retries can be less than or equal to the first retry value. Further, if a workflow element does not successfully execute following a number of retries equal to a first retry value, the workflow can be retried up to a number of times equal to a second retry value. The first and second retry values can be different or the same. The maximum number of times a workflow element can be retried when the workflow is retried is the product of the first and second retry values.

Additionally, in various embodiments, if a child or lower level workflow element does not successfully execute, then a parent workflow or parent workflow element can be retried. Additionally, dependencies can be inserted so that execution of one workflow element depends on execution of another workflow element.

BRIEF DESCRIPTION OF THE DRAWINGS

Referring now to the drawings, in which like reference numbers represent corresponding parts throughout, and in which:

FIG. 4C illustrates states of work;

FIG. 4F illustrates timing of tasks;

FIG. 4H illustrates timing of jobs;

DETAILED DESCRIPTION OF ILLUSTRATED EMBODIMENTS

Embodiments of the invention can be executed in a single computer (e.g., a client computer) or in multiple computers, e.g., between a client and one or more servers across a network connection and in various distributed computing environments. FIGS. 1-41 illustrate one exemplary computing environment or "grid" in which system and method embodiments for gathering, modeling and presenting resource data can be implemented. A "grid" is generally known as a collection of nodes, resources or hosts, each of which contributes one or more resources to the grid. The following description of an exemplary grid is provided for purposes of explanation and illustration. Persons skilled in the art will appreciate that embodiments can be used in other distributed computing environments.

Figure 1:
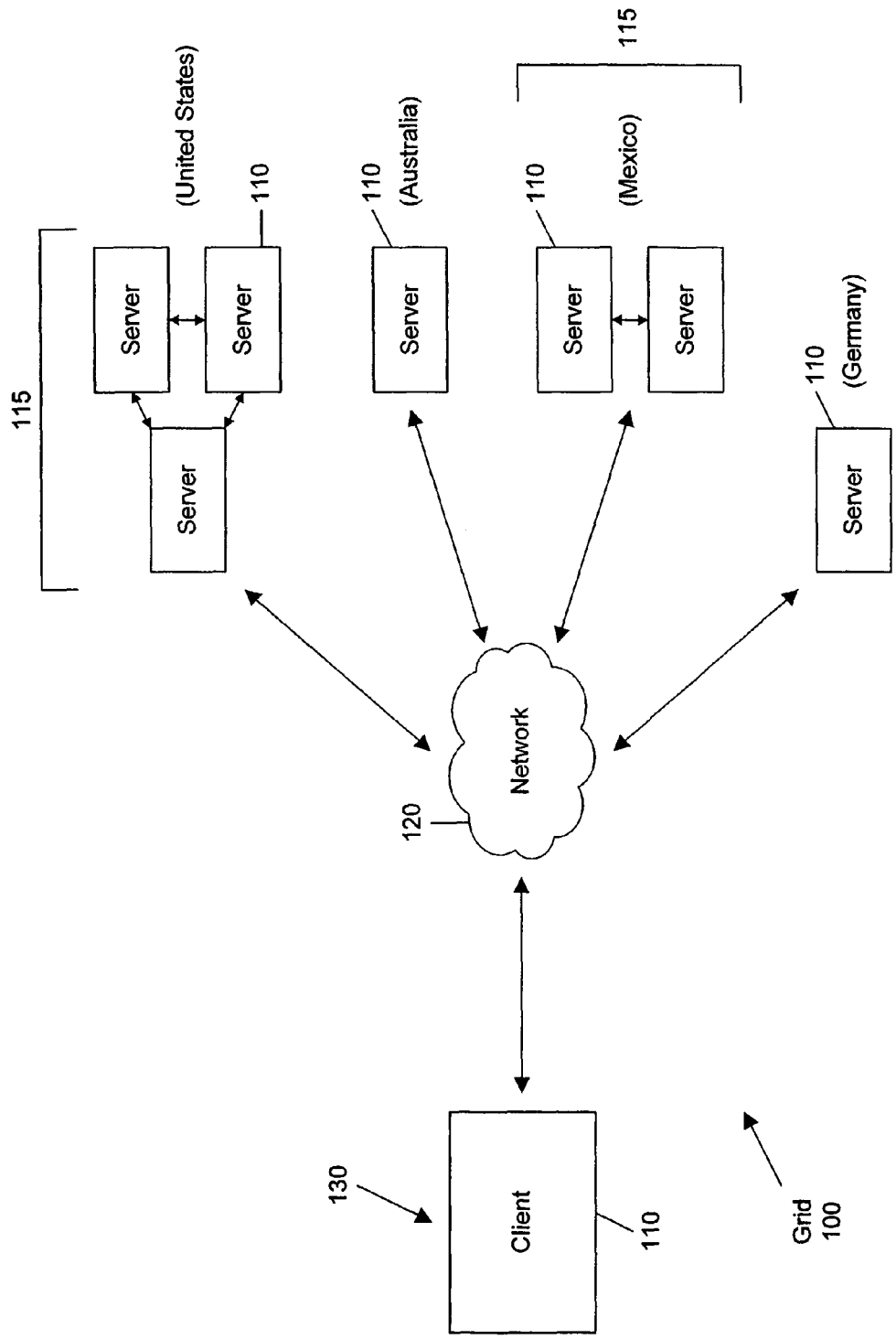
FIG. 1 is a block diagram generally illustrating a grid computing environment in which embodiments can be implemented.
Figure 2:
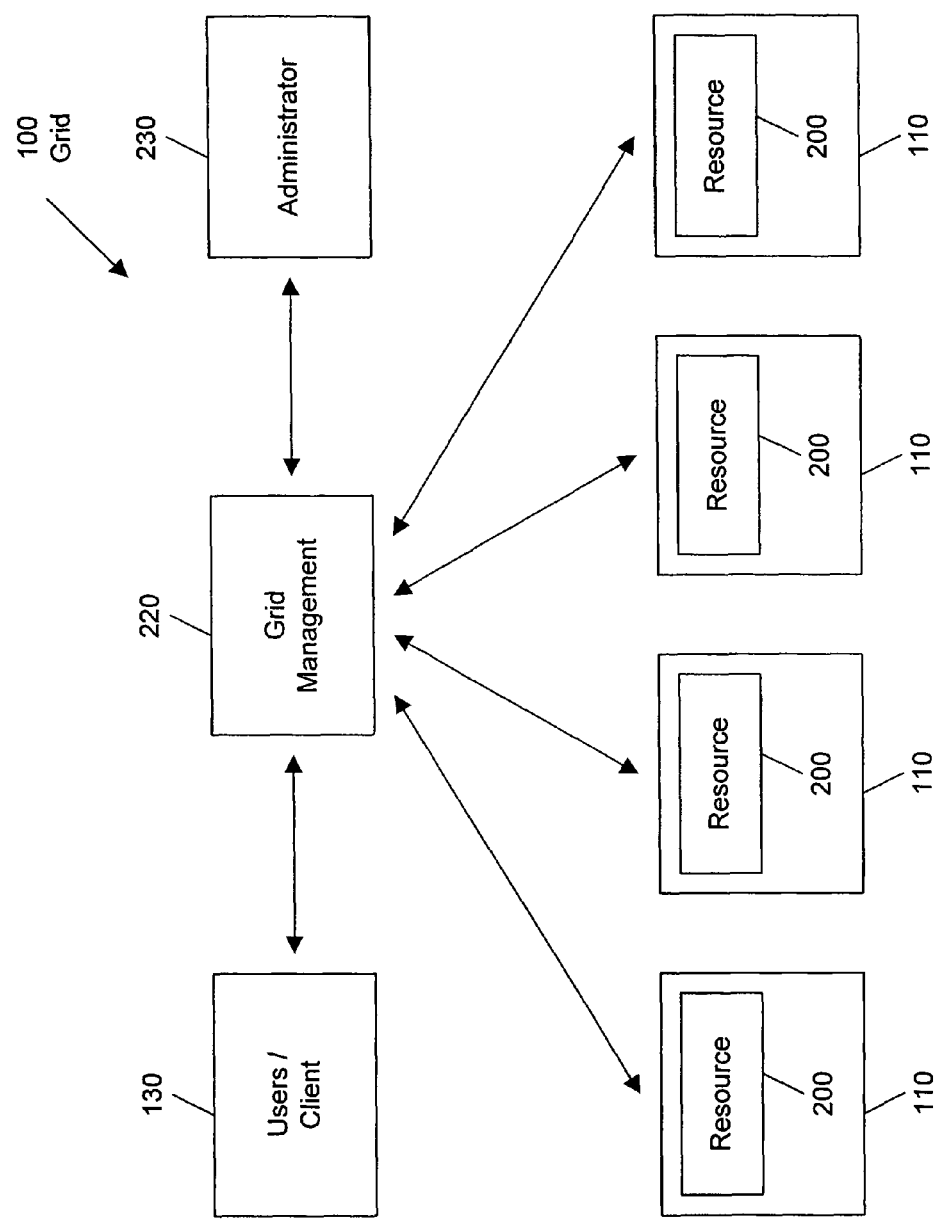
FIG. 2 is a block diagram further illustrating grid management and resources in a grid computing environment.

FIGS. 1 and 2 generally illustrate one exemplary computing grid 100 that includes various numbers of servers 110 or groups of servers or server farms or clusters 115, which are connected via a communication link 120. The communication link 120 can be a network connection, such as a Local Area Network (LAN), a Wide Area Network (WAN), and a Public Switched Telephone Network (PSTN). One computer 130 is identified as the client or the requesting entity, which issues a request for a resource from one or more of the servers 110. The request can be made by, for example, a client process or an object This specification generally refers to a client requesting entity for purposes of explanation, not limitation.

One or more servers 110 in one location can be connected to one or multiple or all of the other servers 110 of the grid via network 120. A server farm 115 or group of servers can be one node or component in a grid 100. Thus, a grid 100 can include different numbers of nodes or server farms 115. The grid 100 can also be distributed across different geographic domains, such as across offices (e.g., offices in the same or different location), different cities, states, countries and continents. Thus the grid may be local and/or external. For purposes of illustration, not limitation, FIG. 1 illustrates a grid 100 that is distributed across different continents. The client or requesting entity 130 is considered to be local or internal and the other servers 110 connected to the network 120 are external relative to the client 130.

The grid 100 can be used to, for example, run an application on multiple servers, allocate computing resources among grid components, provide parallel processing and provide enhanced data storage and processing capabilities. The grid 100 can also be used to allocate and share equipment, software and licenses. For example, if resource on a server 110 is overloaded, a job request can be directed to another server in the grid that has that resource so that the request can be processed. This specification generally refers to a grid in the context of distributed computing and resource allocation, however, grid environments can also be used with other applications, such as communications involving cell phones and personal digital assistants (PDAs).

Referring to FIG. 2, a grid 100 is generally an interconnected set of nodes or servers 110, which host one or more resources 200. The same resource 200 can reside on one or more or all of the servers 110. The resources 200 and organization and control thereof can be managed 220 and controlled by an administrator 230.

Figure 3:
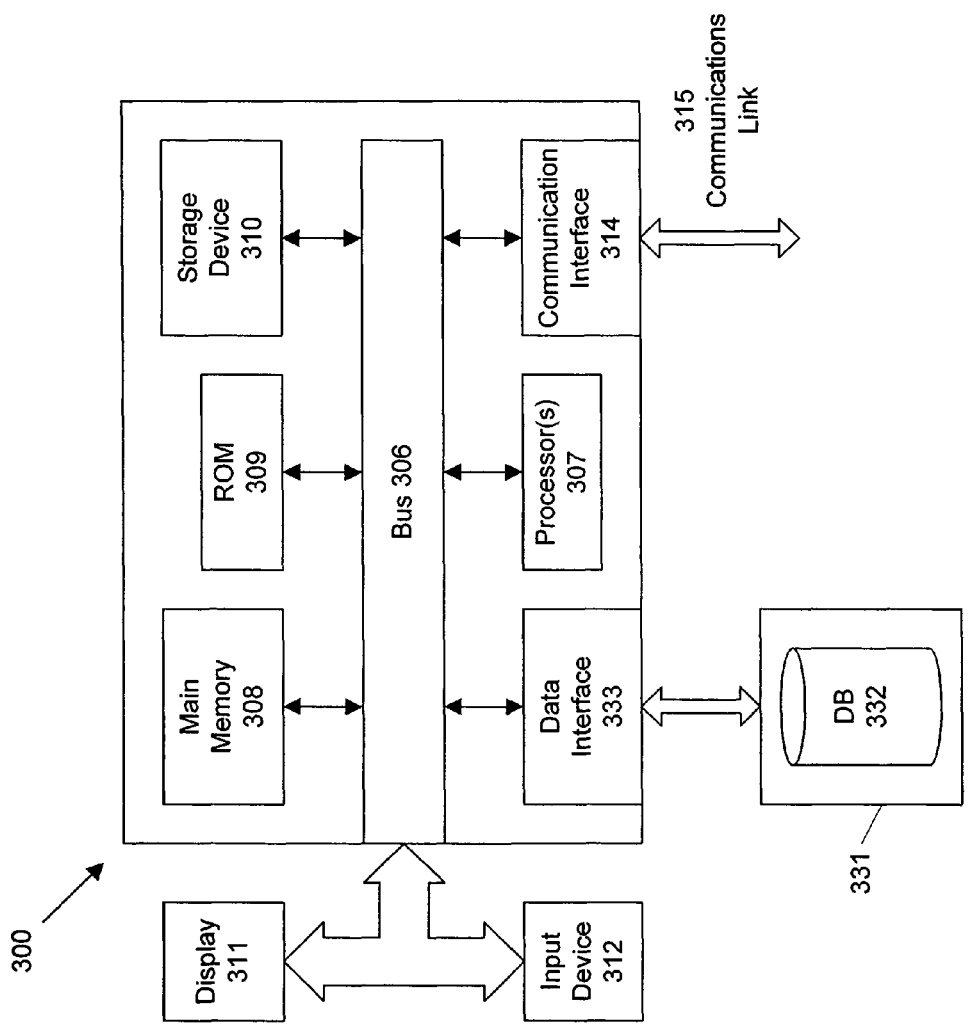
FIG. 3 is a block diagram of an exemplary server of a computing grid.

One exemplary computer system or server 110 that can be used in the grid 100 is shown in FIG. 3. The terms server, computer and computer system are broadly used to describe any computing device that can store and run one or more programs to implement method and system embodiments. Sequences of instructions of embodiments can be performed by a single computer system or server 110 or two or more computer systems or servers 110 coupled by a communication link 315, which serves as an interface to a communications network 120.

Each computer system 300 may include a communication interface 314 coupled to a bus 306. The interface 314 provides two-way communication between computer systems 300 through communication link 315 and network 120. The communication interface 314 transmits and receives electrical, electromagnetic or optical signals that include data streams representing various types of signal information, e.g., instructions, messages and data. The communication link 315 connects one computer system 300 with another computer system 300. For example, the communication link 315 may be a LAN, in which case the communication interface 314 may be a LAN card, or the communication link 315 may be a PSTN, in which case the communication interface 314 may be an integrated services digital network (ISDN) card or a modem, or the communication link 315 may be the Internet, in which case the communication interface 314 may be a dial-up, cable or wireless modem. Other communication interfaces and links can be utilized as needed. The computer system 300 may transmit and receive messages, data, and instructions, including program, such as an application or code, through its respective communication link 315 and communication interface 314. The received program code may be executed by the respective processor(s) 307 as it is received, and/or stored in the storage device 310, or other associated non-volatile media, for later execution.

The computer system 300 can operate in conjunction with a data storage system 331, e.g., a data storage system that contains a database 332 that is accessible by the computer system 300. The computer system 300 communicates with the data storage system 331 through a data interface 333 coupled to the bus 306. The system 300 transmits and receives electrical, electromagnetic or optical signals, that include data streams representing various types of signal information, e.g., instructions, messages and data. In embodiments, the functions of the data interface 333 may be performed by the communication interface 314.

The system 300 includes a bus 306 or other mechanism for communicating instructions, messages and data, collectively, information, and one or more processors 307 coupled with the bus 306 for processing information. The system 300 also includes a main memory 308, such as a random access memory (RAM) or other dynamic storage device, coupled to the bus 306 for storing dynamic data and instructions to be executed by the processor(s) 307. The main memory 308 also may be used for storing temporary data, such as variables and other intermediate information during execution of instructions by the processor(s) 307.

The system 300 may further include a read only memory (ROM) 309 or other static storage device coupled to the bus 306 for storing static data and instructions for the processor(s) 307. A storage device 310, such as a magnetic disk or optical disk, may also be provided and coupled to the bus 306 for storing data and instructions for the processor(s) 307. The computer system 300 may be coupled via the bus 306 to a display device 311, such as, a cathode ray tube (CRT), for displaying information to a user. An input device 312, e.g., alphanumeric and other keys, is coupled to the bus 306 for, communicating information and command selections to the processor(s) 307.

An individual computer system 300 performs specific operations by their respective processor(s) 307 executing one or more sequences of one or more instructions contained in the main memory 308. Such instructions may be read into the main memory 308 from another computer-usable medium, such as the ROM 309 or the storage device 310. Execution of the sequences of instructions contained in the main memory 308 causes the processor(s) 307 to perform the processes described herein. Hard-wired circuitry may be used in place of or in combination with software instructions. Persons skilled in the art will appreciate that OL system and method embodiments can be implemented using other computer systems and hardware and/or software.

Further, embodiments may be stored on various types of computer-usable medium, which is any medium that provides information or is usable by the processor(s) 307. Exemplary media include non-volatile, volatile and transmission media. Non-volatile media, i.e., media that can retain information in the absence of power, includes the ROM 509, CD ROM, magnetic tape, and magnetic discs. Volatile media, i.e., media that can not retain information in the absence of power, includes the main memory 308. Transmission media includes coaxial cables, copper wire and fiber optics, including the wires that comprise the bus 306, and can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Figure 4A:
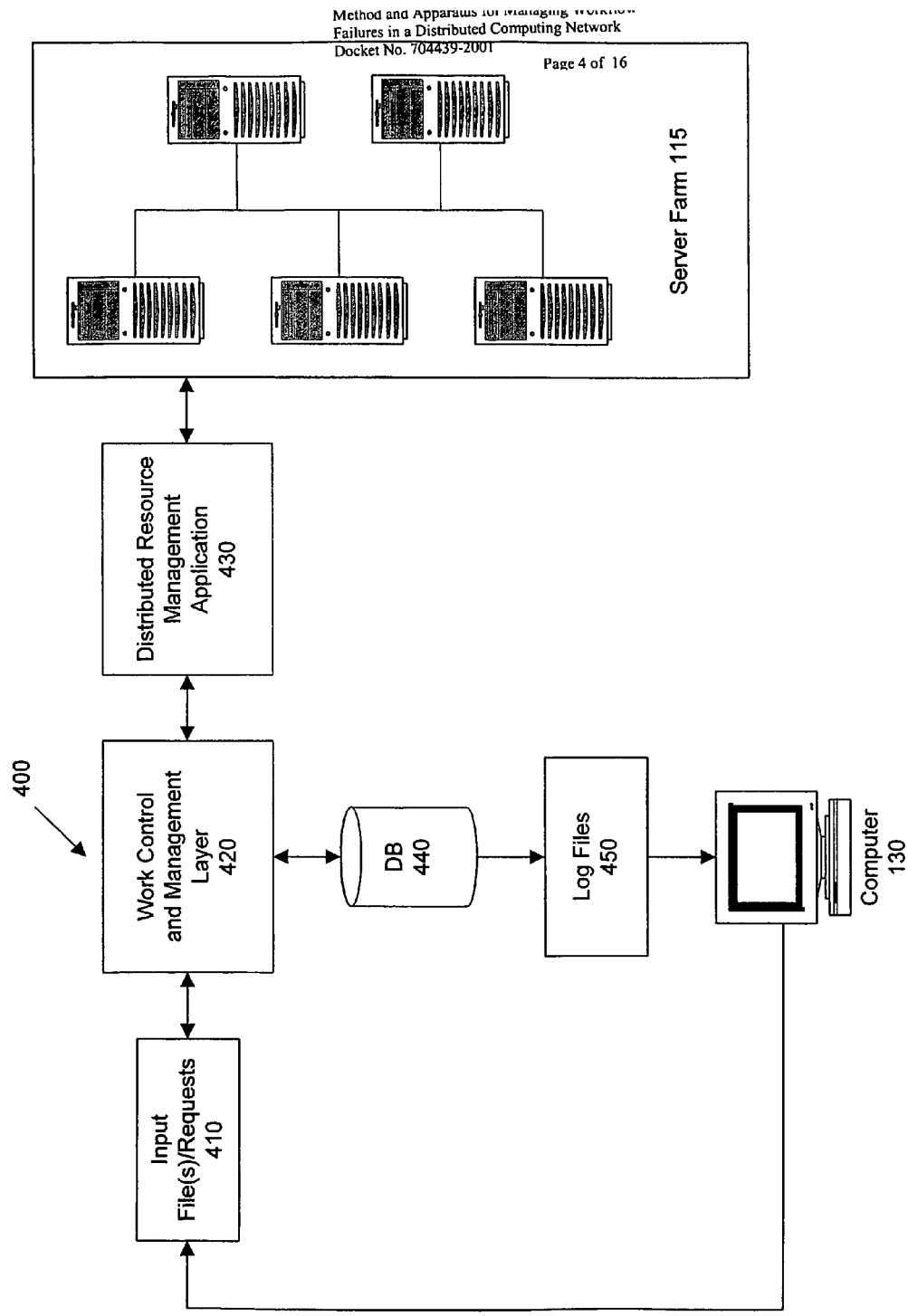
FIG. 4A is a block diagram generally illustrating a grid computing environment having a work control and resource management elements.

Referring to FIG. 4A, according to one embodiment, control and management 220 of the grid 100 and requests issued over the grid 100 is performed using gridMatrix 400, developed by Cadence Design Systems, Inc., 2655 Seely Avenue San Jose, Calif. 95134. The gridMatrix 400 is middleware or software that provides users and administrators control over jobs in the grid. More specifically, the gridMatrix 400 is a job definition, control monitoring and reporting software program.

The exemplary system or environment includes a workstation or client computer 130, from which a user can create and submit one or more input files 410. The input files 410 can be, for example, Job Request Language (JRL) files, that define a work request specifying one or more jobs having one or more executable task commands. Processes use JRL in conjunction with the control and management layer 420, one example of which is the gridMatrix 400, to manage execution of work in the grid 100.

The gridMatrix 400 interprets JRL files 410 and compiles them into objects, which execute on a server 110 or server farm 11 or invoke executables to be run on a server 110. Typically, the objects are passed through the DRM application 430 that schedules and manages work to be run on the processors 107 of a server 110. More specifically, the gridMatrix 400 interprets JRL work requests 410, instantiates distributed objects, invokes software servers to manage execution of commands, and interfaces with DRM 430 applications.

The commands and data correspond to the work that is defined in the input file 410. Thus, the gridMatrix 400 interprets and acts upon the input file 410 and causes the DRM application 430 to execute task commands on a server 110. The database 440 stores information related to many of the processes described herein.

For example, task commands constituent to a piece of work are essentially instantiated into computing objects, which are maintained persistently in the database 440. A persistent object is an object that continues to exist after the program that created it has been unloaded and is stored for later use. Persons skilled in the art that "persistent" in the context of an object generally refers to the duration of the object. Embodiments, therefore, are not to be limited to objects that exist for particular periods of time. Rather, persistent objects may be permanent or temporary and exist for various durations.

Objects are also made to be distributable so that they are accessible to different processes within the work execution flow. Implementation of a conventional distributed object model architecture, such as Common Object Request Broker (CORBA), can be used. CORBA or another suitable standard provides the ability to communicate between objects. A database module of the gridMatrix 400 contains base classes for all objects in the database 440.

An artifact is a piece of data that is used, generated or discarded while working with the grid. Artifacts that are used by the gridMatrix 400 include job definitions, work, tasks, jobs, and workspaces. Each of these artifacts is described in further detail below.

A job definition defines jobs and tasks that will be run when a job is submitted to the gridMatrix 400. The gridMatrix 400 allows users to add job definitions via JRL into the gridMatrix Database. The gridMatrix 400 keeps statistics on job runs, and this information can be presented in text and graphic formats to optimize job definitions for greater efficiency. JRL is the primary mechanism used to import a job definition into the gridMatrix 400. Job definitions can be added to the gridMatrix 400 and stored in a gridMatrix database. One benefit of adding a job definition is that the gridMatrix 400 can store historical information about consecutive job runs which use the same job definition. This information can be analyzed to help determine where the problems are in the process and help optimize the process for decreased execution time. After running a job against a job definition, the definition can be changed to fix problems with the process, to optimize this process, or to add more jobs to the definition.

The gridMatrix 400 can gather statistics from running jobs against the same job definition several times. Trends of execution time, duration, and pending time are given in a graph to show how the process is performing over time. Duration is the wall clock amount of time to run the job from submission to completion. Pending is the amount of time it takes the DRM 430 to dispatch the jobs to machines in the grid 100. Sequential is the cumulative amount of time it takes to run the tasks on machines in the grid 100 (i.e., if run sequentially, how long it would take).

Figure 4B:
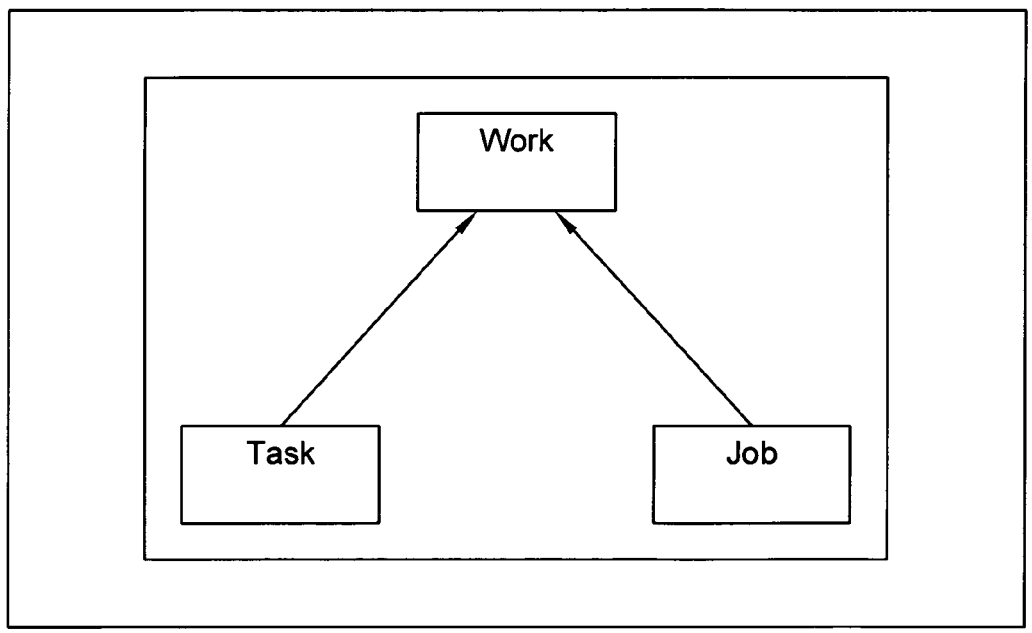
FIG. 4B illustrates jobs and tasks as different types of work.

Referring to FIG. 4B, "work" or "workflow" represents all types of work, including jobs, topjobs and tasks. Work, and constituent jobs, can be defined with one or more JRL files. Work and workflow are generic terms for anything that the gridMatrix 400 can execute and control. Thus, "work" and "workflow" are generic terms for anything that the work control and management layer 420 can control, execute, or cause to be executed.

Work may include processes to compile or build a program, to create file directories, install applications, maintain job dependencies, etc. In other words, work includes whatever a user needs to be performed or processed.

Figure 4D:
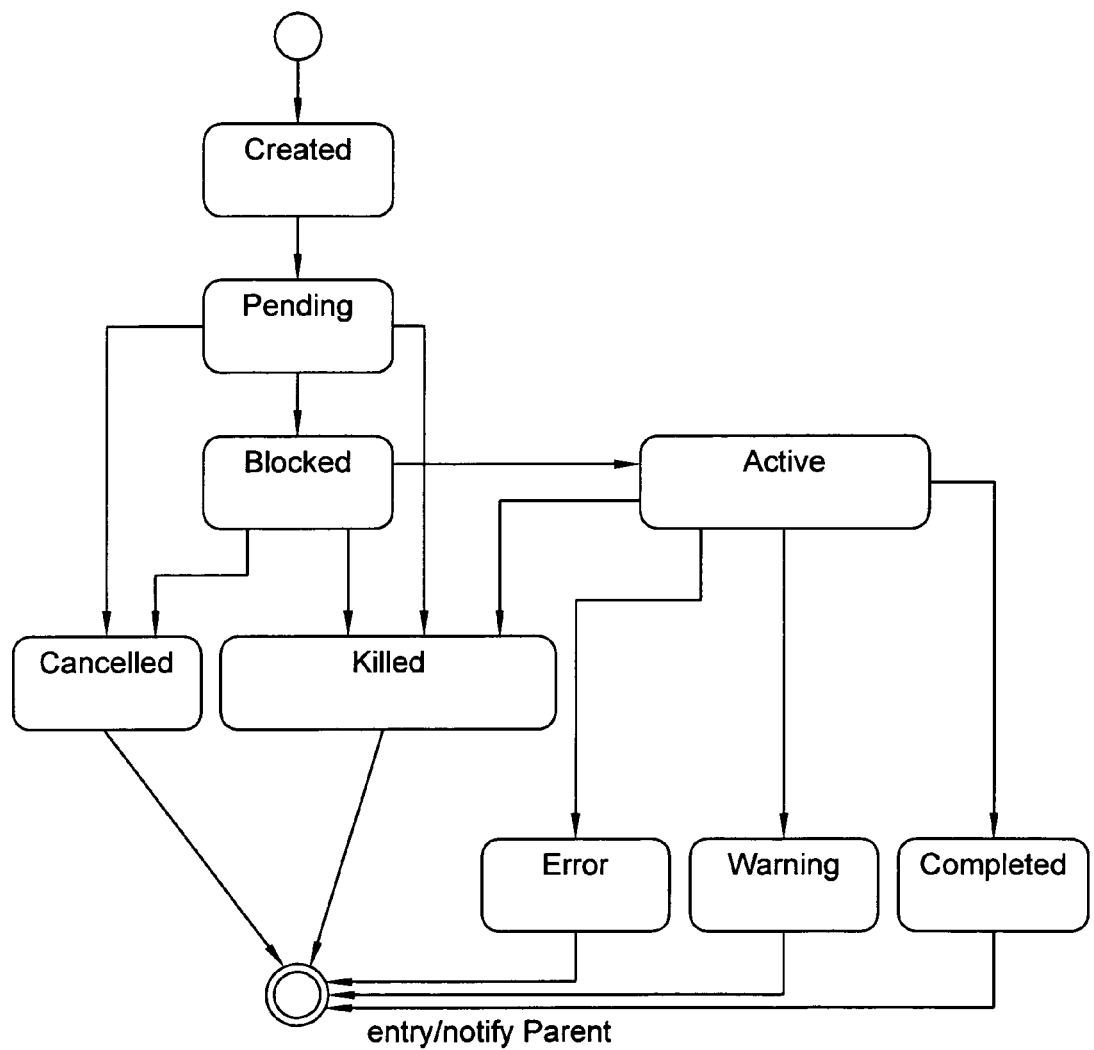
FIG. 4D further illustrates states of work.

Referring to FIGS. 4C and 4D, according to one embodiment, there are nine work states in the gridMatrix 400. Each states determines the behavior of the work and limits the next state(s) that it can transition into.

More specifically, the created state is the starting state of all work in the gridMatrix 400. Work will move from the created state to a scheduled state when scheduled for execution. The "pending" state follows the created state and denotes that work has been scheduled, but has not been sent to be executed. When work is sent for execution, it moves to the "blocked" state. In other words, after work has been pending, it moves to the blocked state, which denotes that the work has not met the criteria to be executed. When the criterion for the work has been met, the work will be moved to the active state. Tasks may be suspended until manual intervention to resume is performed. When work has met the criteria for leaving the blocked state, it moves to the active state. Work that completes its activity without warning, error or termination, transitions from the active state to the completed state. This state is also referred to as the successfully completed state. Work that is completed with some warnings, but no errors or termination, transitions from the active to warning state. The conditions for completion of work with warnings can be specific to the type of work. Work that completes with some errors, but not termination, transitions from the active to error state. The conditions for completion of work with an error can be specific to the type of work. Work properly terminated using, for example, a "matrix kill" command, after the created state, but before entering one of the finished states (completed, warning and error), moves to the killed state. The actions and conditions for a killed state can be specific to the different types of work. Work can be cancelled when criteria for execution cannot be satisfied. This can be due to a number of different factors.

A task is represented in a job definition as described by JRL, much the same as the job is represented. A task is a type of work and inherits all of the operations from work. A task represents the actual command that needs to be called in the grid 100. In other words, a task is an atomic unit of work that is performed on a server 110 and is a command that is executed on one or more processors of a networked multiprocessor computing environment.

Figure 4E:
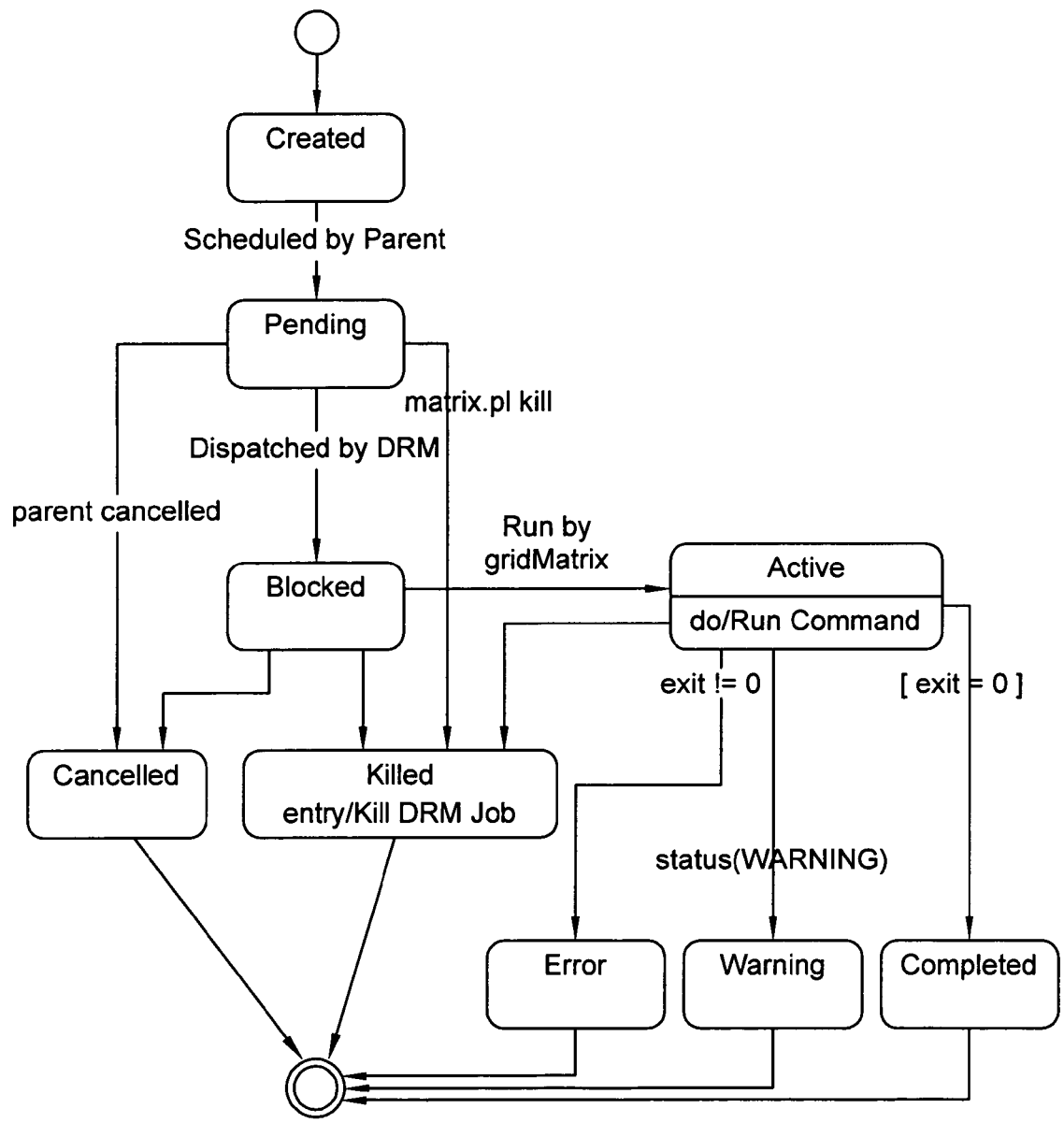
FIG. 4E illustrates states of a task.

Referring to FIG. 4E, a task has certain states. According to one embodiment, a task has the same states as work. A task begins in the created state. A task is moved from the created state to a pending state when a parent job schedules the task. The task is scheduled when the parent job is moved to the active state. Tasks in the pending state can be moved to the blocked state. A task is moved from the pending state to a blocked state when the task is submitted to the DRM 430. The task stays in the blocked state until the DRM 430 executes it. All tasks must move through the blocked state before actually performing work. The longer a task is in the blocked state, the longer it sits in the DRM 430 queues waiting to be distributed to a machine. The job will continue to stay in the blocked state until all of its dependencies have been satisfied. Tasks may be suspended until manual intervention to resume is performed. A task is moved from the blocked state to an active state when the task is actually executed on a host machine for the task.

A task is moved from the active state to a completed state when the corresponding command has finished executing. After the job is set to the completed state, it notifies its parent that it has finished. This is a type of state propagation that begins a chain of notification when a task's parent is notified. The parent will only change its state to completed when all of its children have the state completed.

A task can be moved from the active state to a warning state, after which the job notifies its parent that it has finished. This is a type of state propagation that begins a chain of notification when it's parent is notified. The parent will only change its state to warning when all of its children are in a finished state (completed, warning or error) and at least one in the warning state. A task is moved from the active state to an error state when the command executed returns a exit value that is not 0 (which is the standard failure exit code for commands). After the job is set to the error state, it notifies its parent that it has finished. This is a type of state propagation that begins a chain of notification when it's parent is notified. The parent will only change its state to error when one of its children have the state error. A task transitions from a previous (not finished) state to the killed state when a gridMatrix kill command is issued. The user can specify any of the jobs or tasks by ID when killing a job. When a task is moved to this state, it will kill all processes and sub processes of the executing command. The state propagation moves both up and down the tree. After the job completes "killing" its subwork, it notifies its parent that it has finished. The parent will only change its state to killed when all of its children are in a finished or a killed state. A killed state also results if a timeout is set for a job or task and the job doesn't finish in the set time. A task transitions from a pending or blocked state to a cancelled state when a parent is canceled. Since tasks do not have dependencies, they can not be cancelled directly. Rather, only their parent jobs can be cancelled, and as a result the task will never run, and it is marked cancelled.

Tasks in a job are run sequentially. A task does not start until all previous subworks are finished. If the previous subwork is a task, then it does not start until that task is completed. If the previous subwork is a job, then the task will not start until all previous jobs are complete.

FIG. 4F illustrates one example of timing of tasks. As can be seen in FIG. 4F, tasks are not in a pending state until its parent job is in an activate state (1.1.1.1.). Further, parent jobs are not completed until all of the tasks are completed (1.3). Additionally, tasks that are neat to each other in the job definition are run sequentially (1.5.1.3). When a task's command finishes, the exist status is set in the gridMatrix. For example, an error can be indicated by =!0, completed is indicated by =0.

A job is a type of work and represents a collection of jobs and/or tasks to be executed in the grid 100. Tasks are grouped together to form jobs. A job can be executed, controlled and reported by the management layer 420. Jobs can have zero or more sub-works, which can be a task or another job (i.e., sub-job). JRL provides the capability of defining jobs and passing parameters to the job definitions, which are instantiated as job objects. The parameters are used to create commands that represent tasks that execute on a server. The results of a task are maintained in a log file 450.

The gridMatrix 400 runs all jobs in parallel. All jobs can be run at the same time. Placing dependencies between the jobs lets the gridMatrix 400 know what order the individual tasks should be executed. The gridMatrix 400 gives the user the ability to define dependencies between jobs within the job definition. A job with a dependency, or multiple dependencies, does not execute until all dependencies are satisfied. More specifically, jobs encompass prerequisites and dependencies and can depend on any other job or subjob in a job definition. Job dependencies define the order that jobs are executed. A job may have 0 or more subworks, which can be a task or a job. This layering of jobs allows users to define complex multi-leveled job definitions in the gridMatrix 400. Thus, a user can break down complex processes into small and manageable steps that can be analyzed and controlled.

Figure 4G:
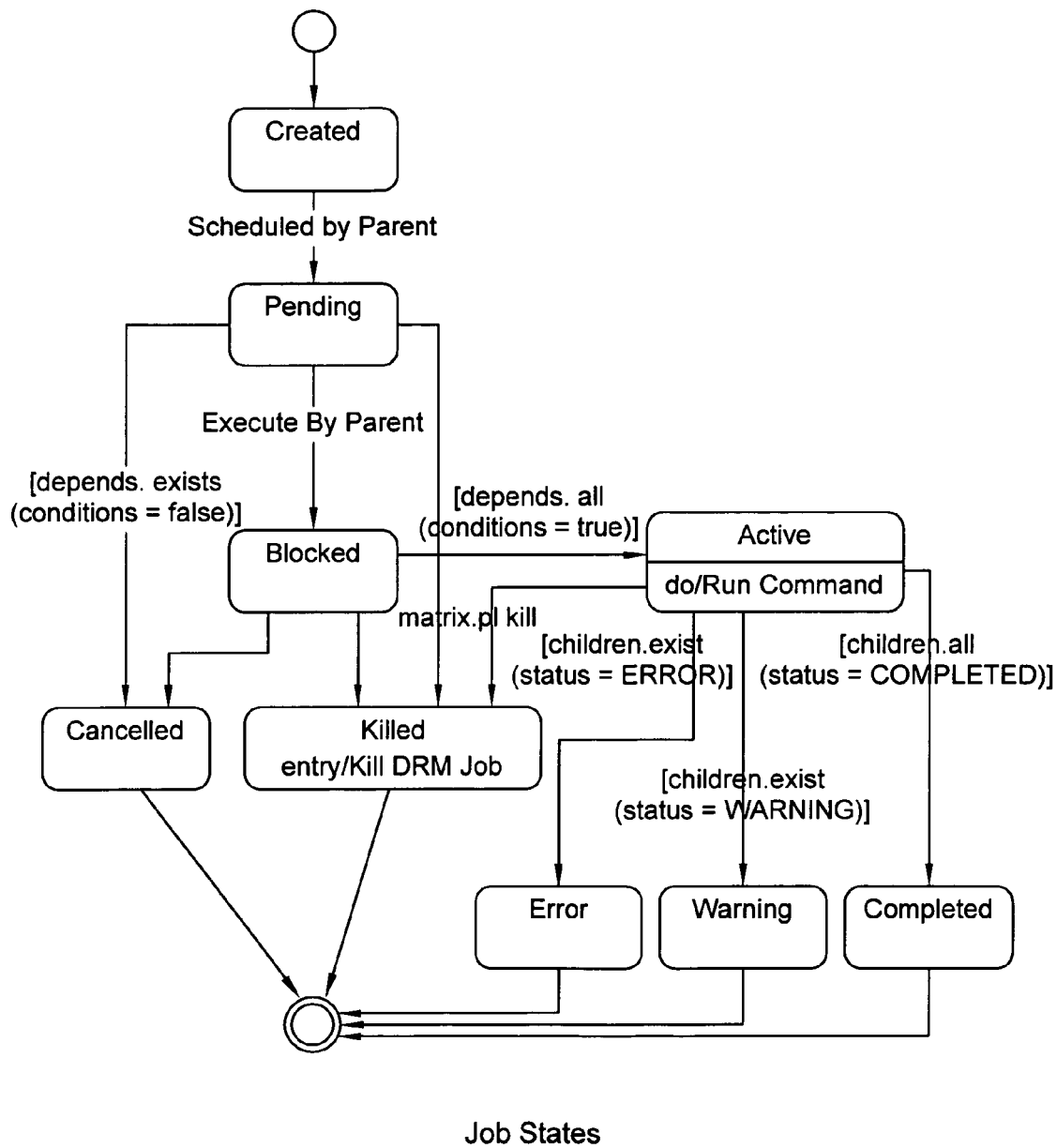
FIG. 4G illustrates states of a job.

Referring to FIG. 4G, a job has states that are similar to the states of work. The names of the states are the same, but there are additional ramifications to the states of a job. All jobs begin in the created state. A job is moved from the created state to a pending state when the parent job schedules the job. If the job is the top level job, it is scheduled by the gridMatrix when the job is submitted to be run. A job is moved from the pending state to a blocked state when the parent job executes the job. All jobs must move through the blocked state before actually performing work. The job will continue to stay in the blocked state until all of its dependencies have been satisfied. Tasks may be suspended until manual intervention to resume is performed.

A job is moved from the blocked state to an active state when all the dependencies of the job have been satisfied. Each time a dependent job finishes, a message is sent to the job that it depends on, and the gridMatrix 400 checks the dependency criteria for all of the dependent jobs. If all criteria are satisfied, the job can move into the active state. When a job is in the active state, all subworks are first scheduled (subworks are moved to the pending state) and then the gridMatrix 400 will execute all subwork of the job (all subworks are moved to the active state). This propagation of state continues to the leaf nodes of the job aggregation tree. The timing diagram for the job shows the propagation of state.

A job is moved from a pending or blocked state to a canceled state when the job's dependencies cannot be satisfied, e.g., when conditional dependencies are used. For example, if a job has a dependency on another job finishing in the error state and the job finishes in the completed state, then the job will be moved into the cancelled state and will never execute. After a job is moved into the cancelled state, it notifies its parent it has finished. This is another type of state propagation, but unlike the active state propagation that moves down the tree, this propagation goes from child to parent.

A job is moved from the active state to a completed state when all of its subworks have been moved to the completed state. When a subwork finishes, it notifies its parent that it has finished. The parent job checks the status of all of its subwork and sets the state to completed if all subwork is completed. After the job is sent to the completed state, it notifies its parent that it has finished. This is another type of state propagation, but unlike the active state propagation that moves down the tree, this propagation moves from child to parent. The parent will only change its state to completed when all of its children have the state completed.

A job is moved from an active state to a warning state when all of the job's subworks have been moved to a finished state (completed, warning or error) with some subworks state being warning. When a subwork finishes, it notifies its parent. The parent job checks the status of all of its subwork and sets the state to warning if at least one of the subworks is in the warning state. After the job is set to the warning state, it notifies its parent that it has finished. This is another type of state propagation, but unlike the active state propagation that moves down the tree, this propagation moves from child to parent. The parent will only change its state to warning when all of its children are in a finished state (completed, warning or error) and at least one in the warning state.

A job transitions from an active state to an error state when all of its subworks have been moved to a finished state (completed, warning or error) with at least one in the error state. When a subwork finishes, it notifies its parent that it has finished. The parent job checks the status of all of its subwork and sets the state to error if at least one of the subworks is in the error state. After the job is sent to the error state, it notifies its parent that it has finished. This is another type of state propagation, but unlike the active state propagation that moves, down the tree, this propagation goes from child to parent. The parent will only change its state to error when all of its children are in a finished state (completed, warning or error) and at least one in the error state. A job transitions from a previous (not finished) state to the killed state when a kill command is used. The user can specify any of the jobs or tasks by ID when killing a job. When a job is moved to this state, it will set the state of all of its subwork that is not finished to the killed state. This propagation is similar to the active state propagation as it travels down the job aggregation tree "killing" all of the children down to the leaf nodes of the tree. In addition to moving down the tree, the state propagation moves up the tree in the same manner as the other finished states. After the job has "killed" its subwork, it notifies its parent that it has finished. The parent will only change its state to killed when all of its children are in a finished state or killed state.

FIG. 4H illustrates one example of timing of jobs. Subjobs are not submitted until a parent job is in an active state. (1.2; children 1.21-4). Further, all jobs pass through a blocked state before becoming active. Jobs with dependencies are put into a blocked state until dependent jobs are completed. For example, as shown in FIG. 4H, 1.3 starts after 1.2 finishes. Further, jobs are not completed until all children jobs are completed. This is true for all finished states (completed, warning and error).

Tasks are executed in an execution environment. The task's execution environment consists of environment variables and a directory hierarchy or working directory. The gridMatrix 400 allows users to define the directory hierarchy and working directory through a concept named workspace. All tasks are run with respect to a workspace. Workspace creation is controlled and monitored by the management layer 420 or the gridMatrix 400. After execution of the tasks within a given workspace, the resources associated with the given workspace are automatically deconfigured, or purged so that resources are freed up for use by other jobs. Further details concerning work, jobs, subjobs, tasks and workspaces are provided in the provisional and non-provisional applications that were previously incorporated herein by reference.

Figure 4I:
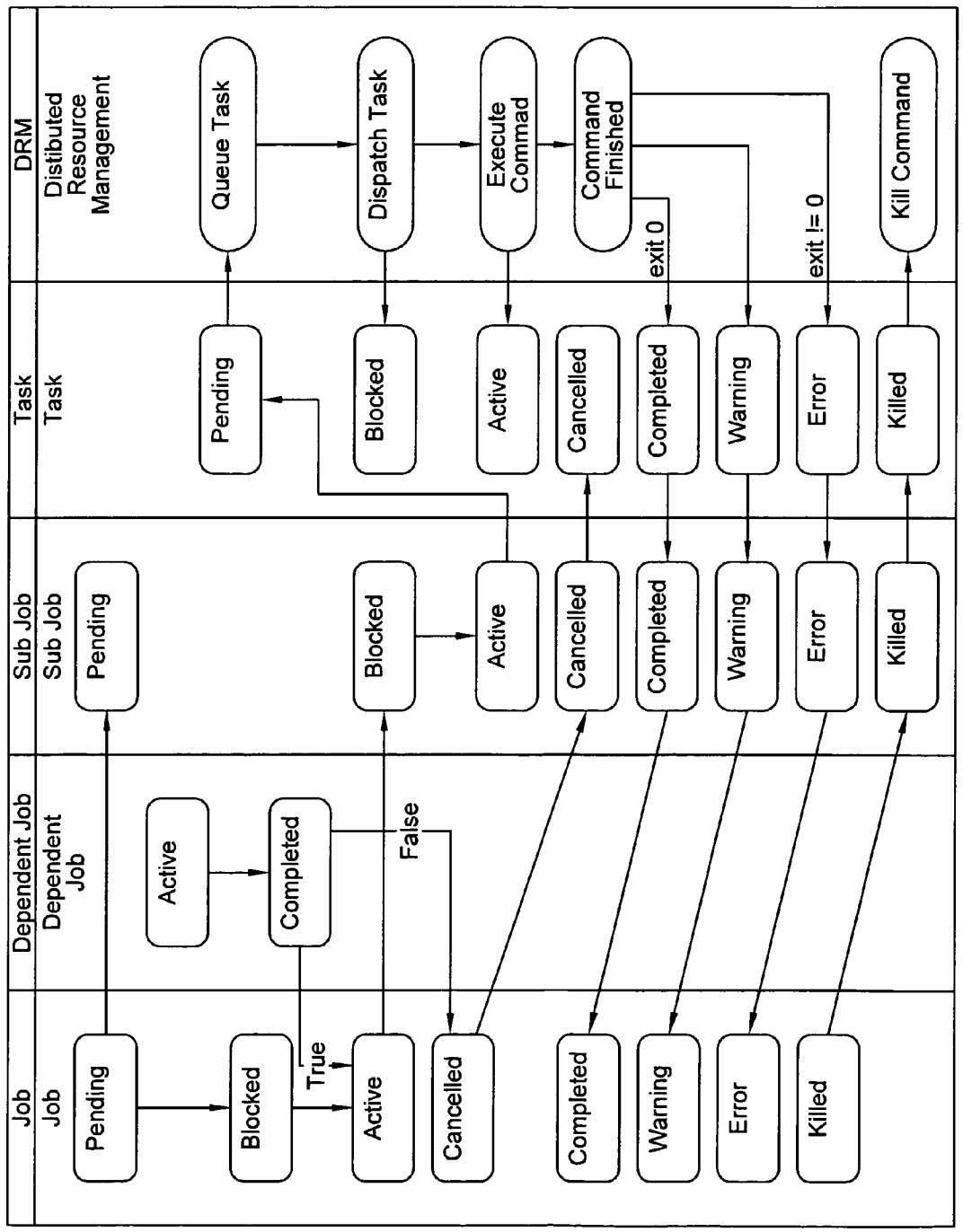
FIG. 4I illustrates how jobs, tasks and a distributed management system of a distributed computing environment interact with each other.

FIG. 4I illustrates how jobs, tasks and the DRM 430 interact with each other. The illustrated example shows how a job with a dependent subjob interacts. More specifically, the job is placed in a pending state by its parent. The job transitions to a Blocked state automatically. The dependent job moves to a completed state from the active state. If the condition on the dependency evaluates to true, the job is moved to an active state. If the condition of the dependency evaluates to false, the job is moved to a cancelled state, which is propagated down to a subjob and the task of the job.

The subjob is moved to a blocked state. The subjob has no dependencies and is moved to an active state automatically. The task is moved to a pending state and is sent to the DRM 430 to be executed. When the task begins execution, the task is marked active. When the task is completed, it can assume one of three states. First, if the exit code is zero, then task assumes a completed state. If the exit code is non-zero, then the state will be an error state. A warning state can be set by a command through a module. The status is passed to the subjob and then up to the job. A job can be killed, and this is propagated down to an individual task. The DRM 430 is notified to kill the command.

Embodiments provide methods for retrying a section or element (generally element) of work or workflow or a workflow tree (generally workflow) or an entire workflow in a distributed computing environment or grid after a failure of a workflow element. One embodiment is directed to determining where a workflow has failed and determining where in the workflow to place a retry. For example, if it is determined that a child element of a workflow failed, then that element can be retried for a predetermined number of times according to a retry value. Other elements of the workflow can be configured in a similar manner. If one or multiple child elements do not successfully execute, then the parent of the failed element(s) can be retried. Thus, when a fault in a workflow is detected, elements of the workflow can be retried, and the retry process can be propagated upwardly through the hierarchy so that higher workflow levels are retried until the workflow is successfully executed (if at all).

Embodiments can also be utilized in systems that utilize workflow dependencies. For example, embodiments involving retrying workflows or sections thereof can be used in grid systems, such as the grid and job relationships described and illustrated in FIGS. 1-4G, which provide the capability establishing different dependences between or among elements, such as jobs having various numbers of subjobs and tasks.

Figure 5:
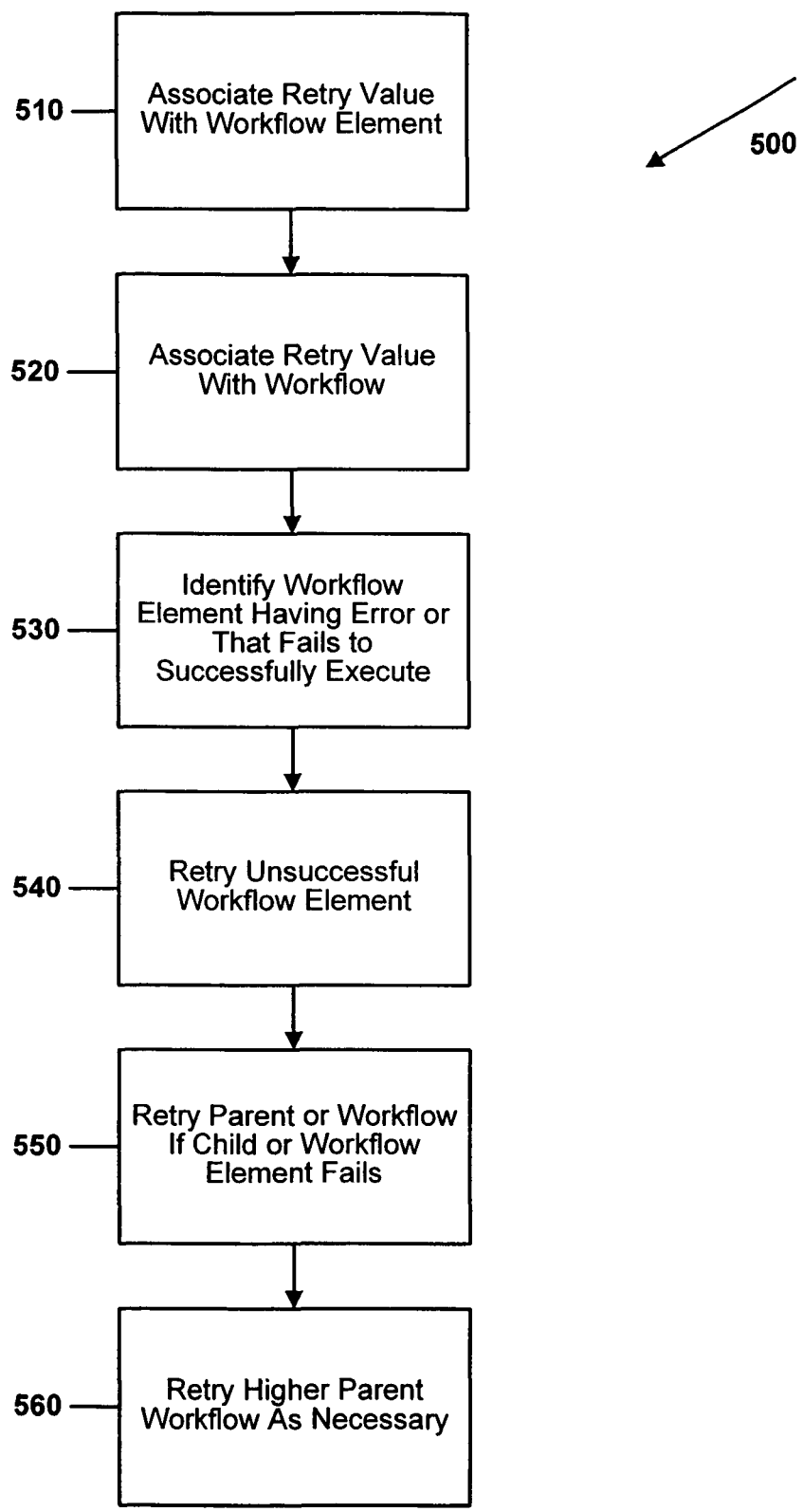
FIG. 5 is a flow diagram illustrating how elements of a workflow can be retried according to one embodiment.

FIG. 5 illustrates a method 500 of retrying elements of a workflow according to one embodiment. In step 510, a retry value is associated with one or more elements or "child" elements of a workflow. In step 520, a retry value is associated with the workflow or "parent" (which includes one or more child workflow elements). Persons skilled in the art will appreciate that steps 510 and 520 are not required to be performed in a particular order.

A retry value, whether for a workflow or parent element, or a child element, identifies, indicates or represents (generally indicates) the number of retries associated with that particular workflow or workflow element. Thus, in the event that a workflow element does not successfully execute, that element can be retried a maximum number of times according to the retry value.

Persons skilled in the art will appreciate that a retry "value" can be numeric, alpha, alpha-numeric and a symbol that directly or indirectly indicates the number of times a particular workflow element can be retried. For example, a retry value of an integer "4" may indicate that the particular workflow element can be retried a maximum of four times. Further, "4" or another value may correspond to or represent another value, which represents the retry value, using, for example, a look up table. Similarly, various symbols and non-numeric indicators can correspond to retrying a workflow element a maximum of four times.

According to one embodiment, the retry value is a predetermined value. In alternative embodiments, the retry value is not predetermined and can be retrieved from various sources or memory and generated on the fly. For purposes of explanation and illustration, not limitation, this specification refers to a retry "value" as a numeric value or integer that represents the maximum number of retries for a particular workflow element.

In step 530, one or more workflow elements that do not successfully execute are identified. Such workflow elements include, for example, elements that are in an error state. According to one embodiment, in the grid described in FIGS. 1-4I, an error state is a state in which a workflow element executes, but terminates with at least one error. Various conditions can define an error causing a workflow to not successfully execute. For purposes of explanation, not limitation, this specification refers to identifying workflow elements that do not successfully execute as a result of having an error when the workflow element terminates.

In step 540, a workflow element that does not successfully execute is retried. The failed element may be retried and successfully executed after a number of retries that is less than or equal to the retry value. The workflow can then continue executing unless it fails for another reason, e.g., another failed child element. For example, if a retry value is 10, the workflow element may fail at first, but then successfully execute after one, two, three, and other numbers of retries, up to 10 retries according to the retry value.

Otherwise, if after the designated number of retries, the identified element has not successfully executed, then in step 550, the workflow or parent is retried. In other words, the execution can proceed up a hierarchy from the one or more failed child elements to a parent element or parent workflow. In this case, the parent of the child element is retried as many times as is specified by the retry value associated with the parent (step 520).

Figure 6:
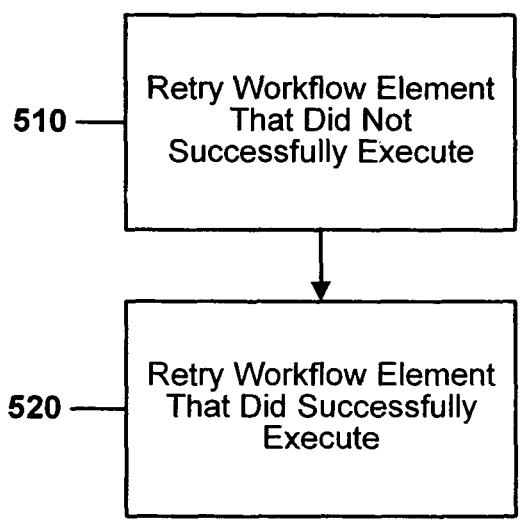
FIG. 6 is a flow diagram illustrating retrying of a parent workflow.

Referring to FIG. 6, according to one embodiment, when a parent or workflow is retried (step 550), then all of the subworks or children are also retried. There may be cases where all or some of the child elements fail to successfully execute. For example, in step 610, every child element that did not successfully execute is retried according to a retry value for each respective element and, in addition, in step 620, each child element that did successfully execute is retried according to a retry value for each respective element.

Referring again to FIG. 5, in step 560, if the parent work continues to fail to successfully complete after the designated number of retries following step 550, then, if applicable, the retry attempts propagate further upwardly through the hierarchy or workflow tree to a grandparent, or greater grandparent, etc. for further retries at a higher level. This means that if any portion of the parent work fails, including a portion that was not originally in error, another retry occurs. Similar to the method shown in FIG. 6, the child work (and other child works associated with the grandparent) are retried, and each grandchild work of each child work is retried. This process can continue upwardly through the workflow hierarchy until successful completion occurs, or until the top level or a specified threshold is reached.

Figure 7:
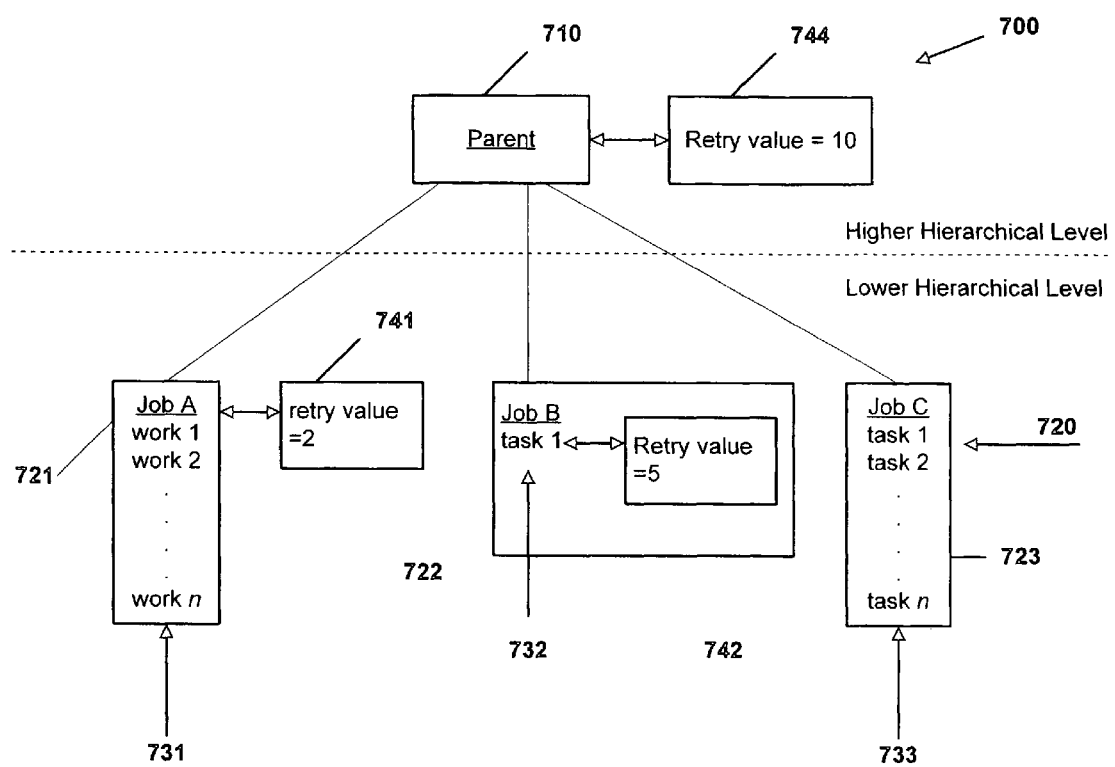
FIG. 7 illustrates retry values associated with a parent workflow and different children workflow elements and how a parent workflow can be retried when a child work element fails according to one embodiment.
Figure 8:
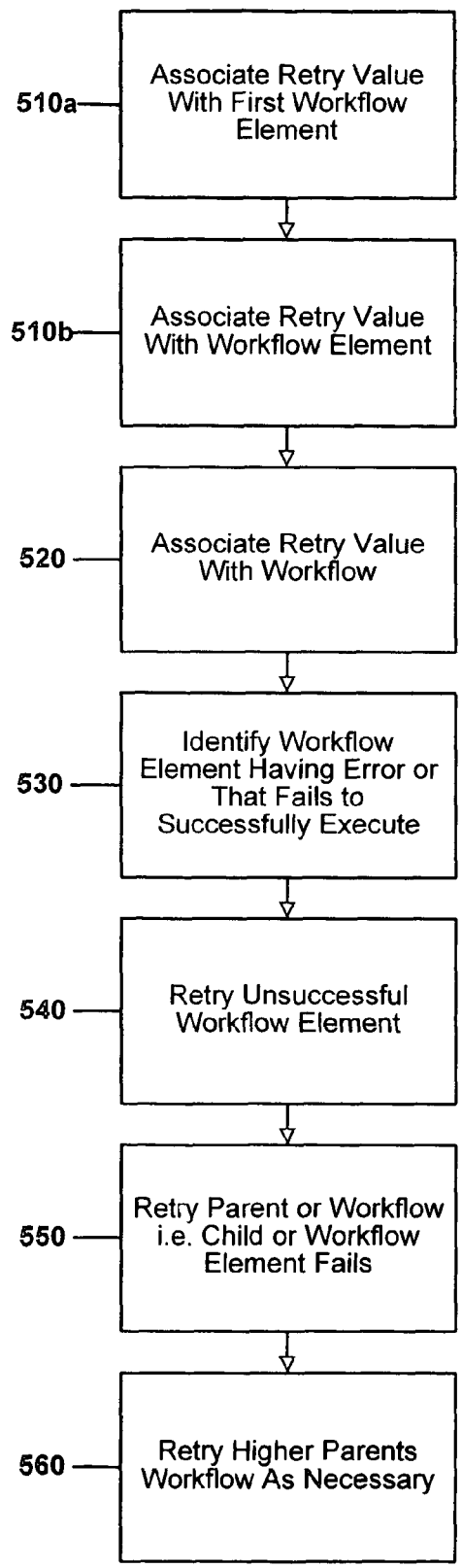
FIG. 8 is flow chart illustrating retrying elements of a workflow having multiple elements and retry values associated with the elements according to another embodiment.

FIG. 7, illustrates in further detail how one embodiment can be implemented. In the illustrated example, a workflow 700 has a parent job 710, which has three child or sub-jobs 720-JobA 721, JobB 722 and JobC 723 (generally 720). The jobs 720 may have various numbers of tasks and/or other types of sub-work. As previously discussed, a child work can be a job or a task. In the example shown in FIG. 7, JobA 721 includes works 1-n 731 (such as subjobs), JobB 722 includes a task 723, and Job C 723 includes multiple tasks 1-n 733. The different components of the workflow 700 can have the same or different retry values. For example, in the illustrated embodiment, JobA 721 is defined to have a retry value 741 of 2. Accordingly, if any child work inside JobA 721 fails, e.g., exits with an error condition, then all of works 1-n 731 of JobA 721 will be rerun two times according to the retry value 741. Thus, for example, if JobA 721 includes 100 different work elements 731, then JobA 721 (and each of the 100 work elements 731) can be run twice according to the retry value 741.

In the illustrated example, Job B includes one task 732, and that task 732 is associated with a retry value 742 of 5. Thus, if that task 732 fails, then only that task 732 will be retried up to five times according to its retry value 742. Job C 723 includes multiple tasks. In the illustrated embodiment, Job C 723 is not associated with a retry value and thus, is not retried if one of its tasks 733 fails to successfully execute.

In the illustrated example, the parent job 710 has a retry value 744 of 10. Accordingly, if any of Jobs A, B or C fails to successfully execute, then the parent job 710 is retried up to 10 times according to the retry value 744. This means that if Job A 721 does not successfully execute, e.g., because any one of its children work 1-n 731 finishes in an error state, then Job A 721 (and all of the associated work 1-n 731) is retried twice. Then, if Job A 721 still cannot successfully execute, the parent job 710 is retried up to 10 times. This results in each of Jobs A, B and C being retried. This is true even if one or both of Jobs B and C 722 and 723 completed successfully. Stated otherwise, if Job A 721 fails for any reason, it will actually be retried a maximum of 20 times. The 20 retries in this example is the result of the product of (the retry value 741 of Job A) and (the retry value 744 of the Parent), or 2*10=20. The same method applies to other jobs 720 below the parent 710. Thus, for example, if the task 732 of Job B 722 fails, then that task 732 will be rerun a maximum of 50 times. The 50 retries in this example is the result of the product of the retry value 742 of Job B of 5 and the retry value 744 of the Parent of 10.

Accordingly, so long as at least one child 720 ends up in an error state, then the parent 720 is an error state. Consequently, the parent 720 will retry each of Jobs A, B and C up to ten times until everything successfully completes. Otherwise, if the parent does not successfully execute, the retry method can proceed further up the hierarchy (step 560) to a higher level, such as a grandparent, great-grandparent, etc. until execution is successful.

This approach can be expanded to various hierarchies having various numbers and relationships of jobs, subjobs and tasks. For example, FIG. 7 illustrates associating retry values with 10 child elements, and retrying parents, grandparents, etc. up the hierarchy as necessary. Persons skilled in the art will appreciate that various numbers of retries and hierarchical structures can be used. Accordingly, embodiments can be used in different hierarchical configurations, and FIGS. 5-8 are provided for purposes of illustration and explanation, not limitation.

Further, as shown in FIG. 4I, for example, embodiments can be applied to perform retry with element dependencies. For example, a dependency can be defined such that a Job C will not run unless a Job A finishes in a certain state, e.g., an error state. If there is a retry value of 2 on Job A, and Job A is run twice and ends in an error state, then Job C will actually run. If the parent of Jobs A and C has a retry value of 10, then as soon as Job C runs and completes (i.e., A, B, C have all completed), then the parent job may check its children work to see if any have errors. The parent may find that Job A has not successfully executed and has errored out. Consequently, the parent job runs all of its children again. During the second retry by the parent job, assume that Job A completes successfully. In this case, Job C is cancelled the second time due to the dependency. In this example, the first time Job C was executed, but the second time, Job C is actually in a cancelled state. Accordingly, there may be restrictions on a retry, e.g., based upon canceling jobs with this type of job dependency. The above example is provided for purposes of explanation, not limitation, as various dependencies and dependency chains and relationships can be incorporated into various hierarchical workflows with different retry values for the parent and child work elements.

Following is a description of one manner of implementing retries within workflows executed on the gridMatrix 400. Persons skilled in the art will appreciate that retries can be implemented in other manners, and the following description is illustrative of how a retry can be implemented in a distributed computing network or grid 100.

According to one embodiment, a retry command is $retry. Thus, $retry=x means retry a workflow element or job "x" times on a failure of the element or job. The following exemplary JR language code illustrates how a retry can be implemented:

Example 1

```
Build( ):
   &BuildPlatform("solaris")
   &BuildPlatform("hpux")
   &BuildPlatform("windows")
BuildPlatform($pPlatform):
   $retry=5
   !make
```

In this example, BuildPlatform will be tried five times until it passes successfully. This shows that the task "make" could be called five times. Jobs are retried at the job level, not the task level. Thus, the whole job will be retried again according to where the $retry is placed.

Example 2

```
Build( ):
   $retry=3
   &BuildPlatform("solaris")
   &BuildPlatform("hpux")
   &BuildPlatform("windows")
BuildPlatform($pPlatform):
   !make $pPlatform
```

In this example, the workflow is completed three times if any one of the BuildPlatforms fails.

If any of the BuildPlatforms fail, all of the BuildPlatforms will be tried again. Even if a BuildPlatform was successful, but one of its siblings failed, then the complete "Build" job will be run again. There is a potential for all three platforms in this example to be run three times if for example the "hpux" platform fails each time.

The $retry variable can be added in the example to try the BuildPlatform as well as the Build job over and over again.

Example 3

```
Build( ):
   $retry=3
   &BuildPlatform("solaris")
   &BuildPlatform("hpux")
   &BuildPlatform("windows")
```

```
BuildPlatform($pPlatform):
    $retry=5
    !make $pPlatform
```

In this example the "BuildPlatform" job will be run five times or until it passes successfully. Let's say that the "windows" BuildPlatform does not pass after five times of trying, then the job "Build" will actually fail and all "BuildPlatform" jobs will be tried again. That means that the "BuildPlatform (windows)" could be called 15 times before the top job "Build" actually finishes.

Example 4

```
FeedAnimals( ):
    $retry=2
    &Feed("Pigs")
    &Feed("Cows")
    &GatherHay( )
    &GetSlop( )
    &BuyMoreHay( )
    &BorrowSlop( )
Feed("Cows"): GatherHay( )[COMPLETED]
    $platform="Big Red Barn"
    !feedCows
Feed("Pigs"): GetSlop( )[COMPLETED]
    $platform="Pig Pen"
    !slopThePigs
BuyHay( ): GatherHay( )[ERROR]
$ platform="Big Hay Barn Inc."
    !buyHay
BorrowSlop( ): GetSlop( )[ERROR]
    $platform="Neighbor"
    !borrowSlop
```

In the above example 4, the JR language file shows how retries can work with conditional dependencies in the Dependency section under examples "Feeding Cows and Pigs." In this final example, there are two attempts to feed the animals, but two paths could be followed depending on the ERROR condition of the GatherHay and GetSlop.

Embodiments have been described with reference to specific illustrates and descriptions thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed:

1. A method of managing a workflow failure in a distributed computing environment of a computing grid, comprising:
   identifying, by using a processor, a first element of a workflow that does not successfully execute in the distributed computing network of the computing grid, wherein the computing grid comprises a grid management for allocating resources among one or more grid components to provide parallel processing of a plurality of elements of the workflow, wherein the workflow comprises a hierarchy with at least a parent element having a plurality of child elements, wherein each of the plurality of elements of the workflow is associated with a retry value that indicates a maximum number of times the corresponding element of the workflow can be retried;
   retrying the first element that does not successfully execute a number of times equal to an associated retry value for the first element, wherein the associated retry value is a first retry value; and
   In response to the first element not successfully executing after retrying the number of times equal to the first value, determining whether the first element has a parent element and retrying the parent element according to a retry value associated with the parent element such that retries proceed up the hierarchy to a higher parent element when any of the plurality of child elements does not successfully execute.

2. The method of claim 1, further comprising the step of:
   retrying the workflow if the first element does not successfully execute after retrying a number of times equal to the first retry value, wherein the workflow is associated with a second retry value.

3. The method of claim 2, wherein the workflow includes one or more additional workflow elements that successfully execute, and retrying the workflow comprises:
   retrying the first element that did not successfully execute after retrying a number of times equal to the first retry value; and
   retrying the one or more additional workflow elements that did successfully execute.

4. The method of claim 2, wherein the second retry value indicates a maximum number of times the workflow can be retried.

5. The method of claim 2, wherein the workflow successfully executes after a number of retries that is less than or equal to the second retry value.

6. The method of claim 2, wherein the first and second retry values are the same.

7. The method of claim 2, wherein the first and second retry values are different.

8. The method of claim 2, wherein a maximum number of times the first element can be retried when the workflow is retried is a product of the first and second retry values.

9. The method of claim 1, wherein the workflow includes one or more additional workflow elements, further comprising the steps of:
   identifying a second element of the workflow that does not successfully execute in the distributed computing network, wherein the second element is associated with a second retry value; and
   retrying the second element, wherein the second retry value indicates a maximum number of times the second element can be retried.

10. The method of claim 9, wherein the first and second retry values are different.

11. The method of claim 9, wherein execution of a second workflow element depends on execution of the first element.

12. The method of claim 11, wherein the first workflow element comprises a first job, the second workflow element comprises a second job, and execution of the second job depends on execution of the first job.

13. The method of claim 1, wherein the workflow comprises a job.

14. The method of claim 13, wherein a job includes a plurality of tasks that are executed sequentially.

15. The method of claim 1, wherein workflow comprises a plurality of jobs that are executed in parallel.

16. The method of claim 1, wherein the workflow comprises a plurality of jobs that are executed in parallel, and, tasks within a job are executed sequentially.

17. The method of claim 1, wherein the workflow comprises a task that is executed on one or more processors of the distributed computing environment.

18. The method of claim 1, wherein the workflow comprises a plurality of tasks that are executed sequentially, and one or more of the plurality of tasks are executed on one or more processors of the distributed computing environment.

19. The method of claim 1, wherein the workflow includes a plurality of workflow elements that are executed in parallel.

20. The method of claim 1, wherein the workflow includes a plurality of workflow elements that are executed sequentially.

21. The method of claim 1, wherein the workflow includes a plurality of workflow elements that are executed in parallel, and subsections of the workflow elements are executed sequentially.

22. The method of claim 1, wherein the workflow includes a plurality of workflow elements, and each workflow element is associated with a retry value.

23. The method of claim 1, wherein the first retry value is a predetermined value.

24. The method of claim 1, wherein identifying the first element that does not successfully execute comprises identifying a workflow element in an error state.

25. The method of claim 24, wherein the error state is a state in which the first workflow element executes, but terminates with at least one error.

26. A method of managing a workflow failure in a distributed computing environment of a computing grid, a workflow having a plurality of workflow elements, the method comprising:

associating each of the plurality of workflow elements with a retry value that indicates a maximum number of times the corresponding workflow element can be retried, wherein a first retry value is associated with a first element of the workflow;

and a second retry value is associated with a second element of the workflow;

identifying, by using a processor, one or more elements of the plurality of workflow elements that do not successfully execute in the distributed computing network of the computing grid, wherein the computing grid comprises grid management for allocating resources among one or more grid components to provide parallel processing of the plurality of workflow elements; and retrying the one or more identified elements that do not successfully execute a number of times equal to an associated retry value for the one or more identified element, wherein the workflow comprises a hierarchy with at least a parent element having a plurality of child elements;

in response to the one or more identified elements not successfully executing after retrying the number of times equal to the associated retry value, determining whether the one or more identified elements has a parent element and retrying the parent element according to a retry value associated with the parent element such that retries proceeds up the hierarchy from a child element of the plurality of child elements to the parent element when the child element does not successfully execute after retrying a number of times equal to an associated retry value for the child element.

27. The method of claim 26, further comprising the step of: retrying the workflow if at least one element of the workflow is not successfully executed after retrying a number of times equal to an associated retry value for the at least one element, wherein the workflow is associated with a third retry value.

28. The method of claim 27, wherein the workflow includes one or more workflow elements that successfully execute, and wherein retrying the workflow comprises the steps of:

retrying the one or more elements that did not successfully execute; and retrying one or more elements that did successfully execute.

29. The method of claim 27, wherein the third retry value indicates a maximum number of times the workflow can be retried.

30. The method of claim 27, wherein all of the first, second and third retry values are the same.

31. The method of claim 27, wherein at least one of the first, second and third retry values is different than the other retry values.

32. The method of claim 27, wherein a product of the first and third retry values represents a maximum number of times the first element can be retried, and the product of the second and third retry values represents a maximum number of times the second element can be retried.

33. The method of claim 27, wherein execution of the second workflow element depends on execution of the first workflow element.

34. The method of claim 33, wherein the first workflow element is a first job and the second workflow element is a second job.

35. The method of claim 27, wherein the first element of the workflow is a first job and the second element of the workflow is a second job, wherein the first and second jobs are executed in parallel.

36. The method of claim 35, wherein a job includes a plurality of tasks that are executed sequentially.

37. The method of claim 27, wherein the first element of the workflow is a job, and the second element is a task.

38. The method of claim 27, wherein the first element of the Workflow is a first task, and the second element is a second task, the tasks being executed sequentially.

39. The method of claim 27, wherein the workflow includes a plurality of workflow elements that are executed in parallel.

40. The method of claim 27, wherein the workflow includes a plurality of workflow elements that are executed sequentially.

41. The method of claim 27, wherein the workflow includes a plurality of workflow elements that are executed in parallel, and subsections of the workflow elements are executed sequentially.

42. The method of claim 27, wherein the first and second retry values are predetermined values.

43. A method of managing a parent workflow that does not successfully execute in a distributed computing environment of a computing grid, the parent workflow having a plurality of child workflow elements, the method comprising:

associating each of the plurality of child workflow elements with a retry value that indicates a maximum number of times the corresponding child workflow element can be retried, wherein a first retry value is associated with a first child workflow element of the parent workflow and a second retry value is associated with a second child workflow element of the parent workflow;

identifying, by using a processor, one or more child workflow elements that do not successfully execute in the distributed computing network of the computing grid, wherein the computing grid comprises grid management for allocating resources among one or more grid components to provide parallel processing of the plurality of workflow elements; and retrying the identified child workflow elements that did not successfully execute a number of times equal to an associated retry value for the identified child workflow elements, wherein the workflow comprises a hierarchy with at least the parent workflow having the plurality of child workflow elements;

in response to the identified child workflow elements not successfully executing after retrying the number of times equal to the associated retry value, determining whether the identified child workflow elements has a parent workflow and retrying the parent workflow according to a third retry value associated with the parent workflow such that retries proceed up the hierarchy from a child element of the plurality of child workflow elements to the parent workflow when the child element does not successfully.

44. The method of claim 43, wherein the parent workflow includes one or more child workflow elements that successfully execute, and retrying the parent workflow comprises:

retrying a first child workflow element that did not successfully execute; and retrying the one or more child workflow elements that did successfully execute.

45. The method of claim 43, wherein a product of the first and third retry values indicates a maximum number of times the first child workflow element can be retried and the product of the second and third retry values indicates a maximum number of times the second child workflow element can be retried.

46. An apparatus for managing a workflow failure in a distributed computing environment of a computing grid, comprising:

a processor programmed for:

identifying a first element of a workflow that does not successfully execute in the distributed computing network of the computing grid, wherein the computing grid comprises a grid management for allocating resources among one or more grid components to provide parallel processing of a plurality of elements of the workflow, wherein the workflow comprises a hierarchy with at least a parent element having a plurality of child elements, wherein each of the plurality of elements of the workflow is associated with a retry value that indicates a maximum number of times the corresponding element of the workflow can be retried;

retrying the first element that does not successfully execute a number of times equal to an associated retry value for the first element, wherein the associated retry value is a first retry value; and In response to the first element not successfully executing after retrying the number of times equal to the first value, determining whether the first element has a parent element and retrying the parent element according to a retry value associated with the parent element such that retries proceed up the hierarchy to a higher parent element when any of the plurality of child elements does not successfully execute.

47. The apparatus of claim 46, wherein the processor is further programmed for:

retrying the workflow if the first element does not successfully execute after retrying a number of times equal to the first retry value, wherein the workflow is associated with a second retry value, wherein the workflow includes one or more additional workflow elements that successfully execute, and the act of retrying the workflow comprises:

retrying the first element that did not successfully execute after retrying a number of times equal to the first retry value; and retrying the one or more additional workflow elements that did successfully execute.

48. The apparatus of claim 46, wherein identifying the first element that does not successfully execute comprises identifying a workflow element in an error state, wherein the error state comprises a state in which the first workflow element executes, but terminates with at least one error.

49. A computer program product comprising a non-transitory computer-usable storage medium having executable code which, when executed by a processor, causes the processor to execute a process for managing a workflow failure in a distributed computing environment of a computing grid, comprising:

identifying a first element of a workflow that does not successfully execute in the distributed computing network of the computing grid, wherein the computing grid comprises a grid management for allocating resources among one or more grid components to provide parallel processing of a plurality of elements of the workflow, wherein the workflow comprises a hierarchy with at least a parent element having a plurality of child elements, wherein each of the plurality of elements of the workflow is associated with a retry value that indicates a maximum number of times the corresponding element of the workflow can be retried;

retrying the first element that does not successfully execute a number of times equal to an associated retry value for the first element, wherein the associated retry value is a first retry value; and In response to the first element not successfully executing after retrying the number of times equal to the first value, determining whether the first element has a parent element and retrying the parent element according to a retry value associated with the parent element such that retries proceed up the hierarchy to a higher parent element when any of the plurality of child elements does not successfully execute.

50. The product of claim 49, further comprising:

retrying the workflow if the first element does not successfully execute after retrying a number of times equal to the first retry value, wherein the workflow is associated with a second retry value, wherein the workflow includes one or more additional workflow elements that successfully execute, and the act of retrying the workflow comprises:

retrying the first element that did not successfully execute; and retrying the one or more additional workflow elements that did successfully execute.

51. The product of claim 49, wherein identifying the first element that does not successfully execute comprises identifying a workflow element in an error state, wherein the error state comprises a state in which the first workflow element executes, but terminates with at least one error.

* * * * *